United States Patent
Ito et al.

(10) Patent No.: US 6,812,312 B1
(45) Date of Patent: Nov. 2, 2004

(54) RUBBER, RUBBER COMPOSITION, AND CROSSLINKED OBJECT

(75) Inventors: Suguru Ito, Kawasaki (JP); Hiroyuki Kotsuji, Kawasaki (JP); Hiroko Ohnishi, Kawasaki (JP)

(73) Assignee: Zeon Corporation, Tokyo (JP)

( * ) Notice: Subject to any disclaimer, the term of this patent is extended or adjusted under 35 U.S.C. 154(b) by 12 days.

(21) Appl. No.: 10/089,104

(22) PCT Filed: Oct. 16, 2000

(86) PCT No.: PCT/JP00/07160

§ 371 (c)(1),
(2), (4) Date: Apr. 15, 2002

(87) PCT Pub. No.: WO01/27171

PCT Pub. Date: Apr. 19, 2001

(30) Foreign Application Priority Data

Oct. 15, 1999 (JP) .......................................... 11-293269

(51) Int. Cl.[7] ............................................. C08F 220/46
(52) U.S. Cl. ..................... 526/313; 526/319; 526/335
(58) Field of Search ................................. 526/335, 313, 526/319, 336, 341; 525/328.3, 338, 339, 234, 315, 329.3, 343, 387

(56) References Cited

U.S. PATENT DOCUMENTS

| | | |
|---|---|---|
| 4,404,329 A | 9/1983 | Maeda et al. |
| 4,421,884 A | 12/1983 | Oyama et al. |
| 4,643,938 A * | 2/1987 | Oyama et al. ................. 442/91 |
| 5,013,797 A * | 5/1991 | Hayashi et al. .......... 525/328.3 |

FOREIGN PATENT DOCUMENTS

| | | |
|---|---|---|
| JP | 54-132647 | 10/1979 |
| JP | 58-37034 | 3/1983 |
| JP | 62-156144 | 7/1987 |
| JP | 62-212405 | 9/1987 |
| JP | 63-095242 | 4/1988 |
| JP | 05-009337 | 1/1993 |

* cited by examiner

Primary Examiner—Robert D. Harlan
(74) Attorney, Agent, or Firm—Armstrong, Kratz, Quintos, Hanson & Brooks, LLP

(57) ABSTRACT

A nitrile group-containing highly saturated copolymer rubber comprising (a) 0 to 20% by weight of 1,3-butadiene units, (b) 0 to 50% by weight of saturated 1,3-butadiene units, (c) 40 to 50% by weight of α,β-ethylenically unsaturated nitrile monomer units, and (d) 10 to 35% by weight and at least 8% by mol of other monomer units, wherein the sum of 1,3-butadiene units (a) and saturated 1,3-butadiene units (b) is in the range of 20 to 50% by weight. A rubber composition comprising this copolymer rubber and a crosslinking agent gives a crosslinked product exhibiting good oil resistance, namely, good resistance to rancid gasoline and not hardening even when it is placed in contact with oil containing condensed aromatics.

13 Claims, No Drawings

RUBBER, RUBBER COMPOSITION, AND CROSSLINKED OBJECT

TECHNICAL FIELD

This invention relates to a nitrile group-containing highly saturated copolymer rubber used as material for a crosslinked rubber product having excellent oil resistance, a crosslinkable rubber composition comprising the nitrile group-containing highly saturated copolymer rubber, and a crosslinked product of the crosslinkable rubber composition.

BACKGROUND ART

Longer service quality and less maintenance are required for automobiles, and thus, greater durability is required for automobile parts. Especially, less volume change with time is required for rubber parts placed in contact with oil such as gasoline and a lubricating oil.

As rubber exhibiting less volume change with time when it is placed in contact with oils, a nitrile group-containing highly saturated copolymer rubber having a reduced content of carbon-carbon double bonds, namely, a hydrogenation product of a nitrile group-containing hydrocarbon rubber ouch as an acrylonitrile-butadiene copolymer rubber, was proposed, for example, in Japanese Unexamined Patent Publication No. 854-132647. A crosslinked product of the nitrile group-containing highly saturated copolymer rubber exhibits excellent resistance to rancid gasoline and to ozone, and thus, is widely used as sealing materials and hoses in automobiles. However, the nitrile group-containing highly saturated copolymer rubber made by hydrogenating the copolymer tends to harden when it is placed in contact with oils such as gasoline and a lubricating oil, and thus, the rubber elasticity does not last for a long time. It is not known that a certain hydrogenation rubber product of a nitrile group-containing highly saturated terpolymer rubber having no tendency of hardening even when it is placed in contact with oils.

Oils such as gasoline and a lubricating oil occasionally contain trace amounts of condensed aromatics having a high boiling point such as α-naphthol, anthracene and phenanthrene, which are residual ingredients remaining without separation in a step of refining crude oil. It is presumed that the hardening in oil of a nitrile group-containing highly saturated copolymer rubber occurs due to the fact that the condensed aromatics hinder movement of a high polymer chain in rubber. However, it is difficult to remove the trace amounts of condensed aromatics in a step of refining crude oil and to produce refined oil products such as gasoline and a lubricating oil, which do not harden the nitrile group-containing highly saturated copolymer rubber. Therefore, there has been a demand for an improved nitrile group-containing highly saturated copolymer rubber exhibiting reduced tendency of hardening even when it is placed in contact with refined oil products.

A highly saturated copolymer rubber having an improved cold resistance is known, for example, in Japanese Unexamined Patent Publication No. S63-95242, which is made by hydrogenating a copolymer prepared by copolymerization of an α,β-ethylenically unsaturated nitrile monomer, a conjugated diene monomer and an unsaturated carboxylic acid monomer. A crosslinked product of this highly saturated copolymer rubber contains only a minor amount of nitrile monomer units, and thus, the rubber tends to exhibits a large change in volume when it is placed in contact with oil, especially gasoline.

DISCLOSURE OF THE INVENTION

A primary object of the present invention is to provide a nitrile group-containing highly saturated copolymer rubber which is used as rubber material giving a crosslinked rubber product exhibiting a reduced tendency of hardening and being changed in volume even when it is placed in contact with oils containing residual condensed aromatics, while good resistance to rancid gasoline is maintained, and further to provide a crosslinkable rubber composition comprising the nitrile group-containing highly saturated copolymer rubber, and a crosslinked rubber product made from the crosslinkable rubber product.

To achieve the above-mentioned object, the present inventors made extensive research and found that a crosslinked rubber product made by crosslinking a nitrile group-containing highly saturated copolymer having a special monomer unit composition exhibits greatly reduced swelling in oil, excellent resistance to rancid gasoline and greatly reduced hardening in oil. Based on this finding, the present invention has been completed.

Thus, in one aspect of the present invention, there is provided a nitrile group-containing highly saturated copolymer rubber comprising (a) 0 to 20% by weight of 1,3-butadiene units, (b) 0 to 50% by weight of saturated 1,3-butadiene units, (c) 40 to 50% by weight of α,β-ethylenically unsaturated nitrile monomer units, and (d) 10 to 35% by weight and at least 8% by mol of other monomer units, wherein the sum of 1,3-butadiene units (a) and saturated 1,3-butadiene units (b) is in the range of 20 to 50% by weight.

In another aspect of the present invention, there is provided a crosslinkable rubber composition comprising the above-mentioned nitrile group-containing highly saturated copolymer rubber and a crosslinking agent.

In still another aspect of the present invention, there is provided a crosslinked rubber product made by crosslinking the above-mentioned crosslinkable rubber composition.

BEST MODE FOR CARRYING OUT THE INVENTION

Nitrile Group-Containing Highly Saturated Copolymer Rubber

The nitrile group-containing highly saturated copolymer rubber of the present invention rubber comprises (a) 0 to 20% by weight of 1,3-butadiene units, (b) 0 to 50% by weight of saturated 1,3-butadiene units, (c) 40 to 50% by weight of α,β-ethylenically unsaturated nitrile monomer units, and (d) 10 to 35% by weight and at least 8% by mol of other monomer units, wherein the sum of 1,3-butadiene units (a) and saturated 1,3-butadiene units (b) is in the range of 20 to 50% by weight.

The content of 1,3-butadiene units (a) in the nitrile group-containing highly saturated copolymer rubber is in the range of 1 to 20% by weight, preferably 0 to 15% by weight and more preferably 0 to 10% by weight. When the content of 1,3-butadiene units (a) is too large, the resulting crosslinked rubber product has poor resistance to rancid gasoline and ozone and exhibits a large volume change in oil.

The saturated 1,3-butadiene units (b) in the nitrile group-containing highly saturated copolymer rubber have a structure such that the carbon-carbon double bonds of 1,3-butadiene units have been saturated by hydrogenation. The nitrile group-containing highly saturated copolymer rubber having saturated 1,3-butadiene units (b) can be made by hydrogenating a nitrile group-containing copolymer rubber having 1,3-butadiene units whereby at least part of the 1,3-butadiene units is converted to saturated 1,3-butadiene units (b). The nitrile group-containing highly saturated copolymer rubber having saturated 1,3-butadiene units (b) can also be made directly by copolymerizing 1-butene with 1,3-butadiene, an α,β-ethylenically unsaturated nitrile monomer, and other monomer, whereby saturated 1,3-butadiene units are introduced in polymer. Further, the nitrile group-containing highly saturated copolymer rubber having saturated 1,3-butadiene units (b) can also be made by copolymerizing ethylene with 1,3-butadiene, an α,β-ethylenically unsaturated nitrile monomer, and other monomer, whereby units each composed of two adjacent ethylene units are formed as part of the structural units in polymer.

The content of saturated 1,3-butadiene units (b) in the nitrile group-containing highly saturated copolymer rubber is in the range of 0 to 50% by weight, preferably 10 to 45% by weight and more preferably 15 to 40% by weight. When the content of saturated 1,3-butadiene units (b) is too small, the crosslinked rubber product tends to have poor resistance to rancid gasoline. In contrast, when the content of saturated 1,3-butadiene units (b) is too large, the crosslinked rubber product exhibits a large volume change in oil.

The sum of 1,3-butadiene units (a) and saturated 1,3-butadiene units (b) in the nitrile group-containing highly saturated copolymer rubber of the present invention is in the range of 20 to 50% by weight, preferably 23 to 47% by weight and more preferably 25 to 45% by weight. When the sum of 1,3-butadiene units (a) and saturated 1,3-butadiene units (b) is too small, the resulting crosslinked rubber product has poor rubber elasticity and is brittle. In contrast, when the sum of 1,3-butadiene units (a) and saturated 1,3-butadiene units (b) is too large, the resulting crosslinked rubber product exhibits a large volume change in oil.

As specific examples of the α,β-ethylenically unsaturated nitrile monomer, there can be mentioned acrylonitrile; α-halogenoacrylonitrile such as α-chloroacrylonitrile and α-bromoaorylonitrile; and α-alkylacrylonitrile such as mehacrylonitrile and ethacrylonitrile. Of these, acrylonitrile is preferable. The α,β-ethylenically unsaturated nitrile monomers may be used either alone or as a combination of at least two thereof.

The content of α,β-ethylenically unsaturated nitrile monomer units (a) in the nitrile group-containing highly saturated copolymer rubber is in the range of 40 to 50% by weight, preferably 40 to 48% by weight and more preferably 41 to 46% by weight. When the content of α,β-ethylenically unsaturated nitrile monomer unit (c) is too small, the resulting crosslinked rubber product exhibits a large volume change in oil. In contrast, when the content of α,β-ethylenicaliy unsaturated nitrile monomer units (c) is too large the resulting crosslinked rubber product has poor rubber elasticity.

The monomer units (d) in the nitrile group-containing highly saturated copolymer rubber of the present invention are monomer units other than 1,3-butadiene units (a), saturated 1,3-butadiene units (b), and α,β-ethylenically unsaturated nitrile monomer units (c). The monomer units (d) have been introduced in the nitrile group-containing highly saturated copolymer rubber by copolymerizing 1,3-butadiene, optional 1-butene and an α,β-ethylenically unsaturated nitrile monomer with other copolymerizable monomer or monomers.

The copolymerizable monomer or monomers include α-olefins other than 1-butene, conjugated diene monomers other than 1,3-butadiene, non-conjugated diene monomers, unsaturated carboxylic acid esters, aromatic vinyl monomers, fluorine-containing vinyl monomers, unsaturated monocarboxylic acids, and unsaturated polycarboxylic acids and anhydrides thereof.

The α-olefins other than 1-butene include those which have at least 3 carbon atoms, preferably not more than 12 carbon atoms. As specific examples of the α-olefins, there can be mentioned propylene, 4-methyl-1-pentene, 1-hexene and 1-octene. If 1-butene is copolymerized, it constitutes saturated 1,3-butadiene units (b) which are regarded as being distinguished from monomer units (d).

The conjugated diene monomers other than 1,3-butadiene includes those which have at least 5 carbon atoms and preferably not more than 12 carbon atoms. As specific examples of the conjugated diene monomers other than 1,3-butadiene, there can be mentioned isoprene, 2,3-dimethyl-1,3-butadiene and 1,3-pentadiene.

As specific examples of the non-conjugated diene monomers, there can be mentioned vinylnorbornene, dicyclopentadiene and 1,4-hexadiene.

As specific examples of the α,β-ethylenically unsaturated carboxylic acid esters, there can be mentioned acrylates and methacrylates, which have an alkyl group having 1 to 18 carbon atoms, such as methyl acrylate, ethyl acrylate, butyl acrylate, n-dodecyl acrylate, methyl methacrylate and ethyl methacrylate; acrylates and methacrylates, which have an alkoxyalkyl group having 2 to 18 carbon atoms, such as methoxymethyl acrylate and methoxyethyl methacrylate; acrylates and methacrylates, which have a cyanoalkyl group having 2 to 18 carbon atoms, such as α-cyanoethyl acrylate and β-cyanoethyl acrylate; acrylates and methacrylates, which have a hydroxyalkyl group having 2 to 18 carbon atoms, such as 2-hydroxyethyl acryalte, hydroxypropyl acrylate and 2-hydroxyethyl methacrylate; acrylates and methaorylates, which have an aminoalkyl group with alkyl groups each having 1 to 19 carbon atoms, such as dimethylaminomethyl acrylate, diethylaminoethyl acrylate and dimethylaminoethyl methacrylate; acrylates and methacrylates, which have a trifluoroalkyl group having 2 to 18 carbon atoms, such as trifluoroethyl acrylate and tetrafluoropropyl methacrylate, benzyl acrylates having a fluoro-substituent and benzyl methacrylates having a fluoro-substituent, such as fluorobenzyl acrylate and fluorobenzyl methacrylate; and unsaturated dicarboxylic acid monoalkyl esters and unsaturated dicarboxylic acid dialkyl esters, which have an alkyl group or alkyl groups having 1 to 4 carbon atoms, such as monoethyl maleate, dimethyl maleate, dimethyl fumarate, dimethyl itaconate, n-butyl itaconate and diethyl itaconate.

As specific examples of the aromatic vinyl monomers, there can be mentioned styrene, α-methylstyrene and vinylpyridine.

As specific examples of the fluorine-containing vinyl monomers, there can be mentioned fluoroalkyl vinyl ethers having a fluoroalkyl group having 2 to 10 carbon atoms, such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; and fluorine-containing vinyl aromatic compounds such as vinyl pentafluorobanzoate; and difluroethylene and tetrafluoroethylene.

As specific examples of the unsaturated monocarboxylic acids, there can be mentioned acrylic acid and methacrylic acid.

As specific examples of the unsaturated polycarboxylic acids, there can be mentioned itaconic acid, fumaric acid and maleic acid. As specific examples of the anhydrides of unsaturated polycarboxylic acids, there can be mentioned itaconic anhydride, fumaric anhydride and maleic anhydride.

The content of monomer units (d) in the nitrile group-containing highly saturated copolymer rubber is in the range of 10 to 35% by weight, preferably 11 to 33% by weight and more preferably 12 to 30% by weight, and at least 8% by mol, preferably 8 to 30% by mol and more preferably 9 to 30% by mol. When the content of monomer units (d) is too small, the resulting crosslinked rubber product tends to harden in oil. In contrast, when the content of monomer units (d) is too large, the resulting crosslinked rubber product is liable to have greatly reduced mechanical strength.

Ethylene can also be copolymerized. However, when ethylene units are discretely present in the copolymer chain, the ethylene units are monomer units (d). When ethylene units form units each composed of two adjacent ethylene units, the adjacent ethylene units form saturated 1,3-butadiene units (b). If an even number of continuous ethylene units are present, these ethylene units form a half mol number of saturated 1,3-butadiene units. If an odd number of continuous ethylene units are present, one of the ethylene units form one monomer unit (d) and the remainder of ethylene units form a half mol number of saturated 1,3-butadiene units (b). Thus, if ethylene is copolymerized, it is often not clear without analysis whether the resulting copolymer is a nitrile group-containing highly saturated copolymer rubber of the present invention or not.

As hereinafter mentioned, when a copolymer comprising 1,3-butadiene units (a), monomer units (c) and monomer units (d) is saturated by, for example, hydrogenation, at least part of the 1,3-butadiene units (a) becomes saturated to be thereby converted to saturated 1,3-butadiene units (b), and sometimes a part of monomer units (d) becomes saturated. The latter saturated monomer units are also included in them monomer units (d).

The sum of monomer units (c) and monomer units (d) is preferably in the range of 50 to 80% by weight, more preferably 53 to 77% by weight and especially preferably 55 to 75% by weight. When the sum of monomer units (c) and monomer units (d) is too small, the resulting crosslinked rubber product exhibits a large volume change in oil. In contrast, when the sum of monomer units (c) and monomer units (d) is too large, the resulting crosslinked rubber product becomes has poor rubber elasticity and becomes brittle.

The contents of 1,3-butadiene units (a), saturated 1,3-butadiene units (b), monomer units (c) and monomer units (d) can be determined advantageously by employing a combination of plural methods selected from nitrogen content-determination by semi-micro Kjeldahl method, unsaturation content-determination by infrared absorption spectroscopy or iodine value determination, and identification of partial structures or content ratio determination by infrared absorption spectroscopy, $^1$H-NMR, $^{13}$C-NMR and pyrolysis gas chromatography. Of these, identification of partial structures or content ratio determination by $^1$H-NMR is generally most reliable, but, a plurality of peaks in a $^1$H-NMR chart occasionally coincide with each other which render the determination difficult. Therefore, a combination of $^1$H-NMR with other methods is especially preferable.

The nitrile group-containing highly saturated copolymer rubber of the present invention preferably has a number average molecular weight in the range of 10,000 to 2,000,000, more preferably 30,000 to 1,500,000 and especially preferably 50,000 to 1,000,000. When the number average molecular weight is too small, the rubber tends to have too low viscosity and have poor mechanical strength such as tensile strength. In contrast, when the number average molecular weight is too large, the rubber tends to have too high viscosity and have poor processability.

The process for producing the nitrile group-containing highly saturated copolymer rubber of the present invention is not particularly limited, but preferable is a process wherein a copolymer of 1,3-butadiene, an α,β-ethylenically unsaturated nitrile monomer and other copolymerizable monomer or monomers is hydrogenated whereby at least part of unsaturated bonds in the backbone chain is saturated. For example, a conventional process as described in Japanese Unexamined Patent Publication No. H8-100025 can be employed wherein the copolymer is made by an emulsion polymerization procedure and then the copolymer is hydrogenated.

Crosslikable Rubber Composition

The crosslinkable rubber composition of the present invention comprises as essential ingredients the above-mentioned nitrile group-containing highly saturated copolymer rubber and a crosslinking agent, and other ingredients as optional ingredients.

The crosslinking agent is not particularly limited provided that it is capable of crosslinking the nitrile group-containing highly saturated copolymer rubber of the present invention. However, a sulfur-containing crosslinking agent and an organic peroxide crosslinking agent are preferably used.

As specific examples of the sulfur-containing crosslinking agent, there can be mentioned sulfur such as powdery sulfur and precipitated sulfur; and organic sulfur compounds such as 4,4'-dithiomorpholine, t tramethylthiuram disulfide, tetraethylthiuram disulfide and high molecular weight polysulfide. The amount of the sulfur-containing crosslinking agent is in the range of 0.1 to 10 parts by weight, preferably 0.2 to 7 parts by weight and more preferably 0.3 to 5 parts by weight, based on 100 parts by weight of the nitrile group-containing highly saturated copolymer rubber. When the amount of the sulfur-containing crosslinking agent is too small, the crosslinking density of rubber is reduced and the permanent set becomes large. In contrast, when the amount of the sulfur-containing crosslinking agent is too large, the resulting crosslinked rubber is liable to have poor flexural fatigue resistance and high dynamic heat build-up.

The organic peroxide crosslinking agent includes dialkyl peroxides, diacyl peroxides and peroxyesters. As specific examples of the organic peroxide crosslinking agent, there can be mentioned dialkyl peroxides such as dicumyl peroxide, di-tert-butyl peroxide, 2,5-dimethyl-2,5-di(tert-butyl-peroxy)-3-hexyne, 2,5-dimethyl-2,5-di(tert-butyl-peroxy)hexane and 1,3-bis(tert-butyl-peroxyisopropyl) benzene; diacyl peroxides such as benzoyl peroxide and isobutyryl peroxide; and peroxy esters such as 2,5-dimethyl-2,5-bis(benzoyl-peroxy)hexane and tert-butyl-peroxyisopropyl carbonate. The amount of the organic peroxide crosslinking agent is in the range of 0.5 to 8 parts by weight, preferably 0.5 to 7 parts by weight and more preferably 0.5 to 5 parts by weight, based on 100 parts by weight of the nitrile group-containing highly saturated copolymer rubber. When the amount of the organic peroxide crosslinking agent is too small, the crosslinking density of rubber is reduced and the permanent set becomes large. In contrast, when the amount of the organic peroxide crosslinking agent is too large, the resulting crosslinked rubber is liable to have poor rubber elasticity.

The crosslinking agent can be used either alone or as a combination of at least two thereof. The crosslinking agent can be used as a dispersion in clay, calcium carbonate or silica whereby processability is enhanced.

A crosslinking accelerator can be used in combination with a crosslinking agent. The crosslinking accelerator is not particularly limited. The crosslinking accelerator used in combination with a sulfur-containing crosslinking agent includes zinc oxide, thiuram crosslinking accelerators, guanidine crosslinking accelerators, sulfenamide crosslinking accelerators, thiazole crosslinking accelerators and dithiocarbamate crosslinking accelerators. As specific examples of the crosslinking accelerator, there can be mentioned thiuram crosslinking accelerators such as tetramethylthiuram disulfide, tetraethylthiuram disulfide and N,N'-dimethyl-N,N'-diphenylthiuram disulfide; guanidine crosslinking accelerators such as diphenylguanidine, diorthotolylguanidine and orthotolylbiguanide; sulfenamide crosslinking accelerators such as N-cyolohexyl-2-benzothiazylsulfenamide, N,N'-diisopropyl-2-benzothiazylsulfenamide and N-tertiary-butyl-2-benzothizylsulfenamide; thiazole crosslinking accelerators such as 2-mercaptobenzothiazole and dibenzothizyl disulfide; and dithiocarbamate crosslinking accelerators such as tellurium dimethyldithiocarbamate and zinc dimethyldithiocarbamate As specific examples of the crosslinking accelerator used in combination with an organic peroxide crosslinking agent, there can be mentioned trimethylolpropane trimethacrylate, N,N'-m-phenylenedimaleimide, triallyl isocyanurate, polyfunctional methacrylate monomers, acrylic acid metal salts and methacrylic acid metal salts. These crosslinking accelerators may be used as a combination of at least two thereof depending upon the particularly use of rubber.

According to the need, various ingredients can be incorporated provided that the effect of the present invention can be achieved. The ingredients include, for example, a reinforcing agent, a filler, an age resister, an antioxidant, a light stabilizer, a scorch retarder, a plasticizer, a processing aid, a lubricant, an adhesive mass, a sliping agent, a flame retardant, a mildew proofing agent, an antistatic agent, and a colorant.

Various rubbers, elastomers and resins can be incorporated unless the crosslinkable rubber composition of the present invention is substantially injured. As specific examples of such ingredients, there can be mentioned natural rubber, polybutadiene rubber, polyisoprene rubber, acrylic rubber, styrene-butadiene rubber, acrylonitrile-butadiene rubber, chloroprene rubber, olefin elastomer, styrene elastomer, vinyl chloride elastomer, polyester elastomer, polyamide elastomer, polyurethane elastomer and polysiloxane elastomer. Crosslinking agents and crosslinking accelerators for crosslinking the rubbers, elastomers and resins may be incorporated unless the crosslinkable rubber composition of the present invention is substantially injured.

The crosslinkable rubber composition of the present invention can be prepared by mixing together the rubber, the crosslinking agent and optional ingredients by employing an appropriate mixing method such as roll mixing, Banbury mixing, screw mixing or solution mixing. The order of mixing is not particularly limited. Preferably, ingredients which are not easily thermally decomposed are first thoroughly incorporated in the rubber, and then, crosslinking agent and crosslinking accelerator, which are readily thermally decomposed, are added at a temperature lower than the crosslinking initiating temperature for a time as short as possible.

Crosslinked Rubber Product

The crosslinked rubber product of the present invention is made by crosslinking the above-mentioned crosslinkable rubber composition.

The method for making the crosslinked rubber product is not particularly limited. A method wherein shaping and crosslinking are simultaneously carried out or a method wherein shaping is first carried out and then crosslinking is carried out may be employed. An appropriate method is chosen depending upon the particular shape of crosslinked product or other factors. The method of simultaneously carrying out shaping and crosslinking includes, for example, compression molding, transfer molding and injection molding. The method of shaping followed by crosslinking includes, for example, a method wherein a rubber composition is subjected to extrusion shaping and then crosslinked in a vulcanizing pan.

The crosslinkable rubber composition of the present invention is crosslinked by heating. The heating temperature is preferably in the range of 130 to 210° C., more preferably 140 to 200° C. When the heating temperature is too low, a substantially long time is required for crosslinking and the crosslinking density is liable to be reduced. In contrast, when the heating temperature is too high, the crosslinking time is too short and a defective molding is liable to be produced.

After crosslinking, i.e., first crosslinking, the crosslinked rubber product may be subjected to second crosslinking. The crosslinking time for the first crosslinking and the second crosslinking can be chosen on the crosslinking method, crosslinking temperature and shape of the rubber product. Usually the crosslinking time is chosen in the range of one minute to 20 hours depending on the crosslinking density and the production efficiency.

The heating means may be appropriately chosen from those which are employed for crosslinking rubbers and which includes, for example, press-heating, steam-heating, oven-heating and hot air-heating.

Now the invention will be specifically described by the following examples and comparative examples wherein parts and % are by weight unless otherwise specified. The properties of rubber were evaluated by the following methods.

(1) Tensile Strength and Breaking Elongation

A crosslinked rubber composition was shaped into a sheet with a thickness of 2 mm. The sheet was die-cut by a #3 dumbbell die to prepare a specimen. Breaking tensile strength and breaking elongation were measured according to JIS K6251 at a grip separation speed of 500 mm/min. The smaller the tensile strength, and the smaller the elongation, the rubber product has better fitting property.

(2) Hardness

A crosslinked rubber composition was shaped into a sheet with a thickness of 2 mm. The sheet was die-cut to prepare a square specimen having a size of 25 mm×15 mm. Hardness was measured according to JIS K6253 by using IRHD micro-hardness tester.

(3) Volume Change

A crosslinked rubber composition was shaped into a sheet with a thickness of 2 mm. The sheet was die-cut to prepare a square specimen having a size of 25 mm×15 mm. The specimen was immersed in Fuel D (mixed liquid of isooctane/toluene=3/2 by volume) at 40° C. for 140 hours. The volume change was measured according to JIS K6258.

(4) Hardening

A crosslinked rubber composition was shaped into a sheet with a thickness of 2 mm. The sheet was die-cut to prepare a square specimen having a size of 25 mm×15 mm. The specimen was immersed in mixed Fuel D liquid at 40° C. for 10 days. The mixed Fuel D liquid was prepared by incorporating a condensed aromatic mixture of anthracene/phenanthrene=1/1 by weight in Fuel D to give an oil containing 2% of the condensed aromatic mixture. The specimen was then vacuum-dried for 48 hours and its hardness was measured. For comparison, the specimen was immersed in Fuel D at 40° C. for 10 days, and then Vacuum-dried for 48 hours and its hardness was measured. The hardening was expressed by the difference between the hardness as measured after immersion in Fuel D+condensed aromatic mixture, and the hardness as measured after immersion in Fuel D alone. When the hardness difference is 5 points or larger, the hardening is regarded as occurred.

(5) Resistance to Rancid Gasoline

A crosslinked rubber composition was shaped into a sheet with a thickness of 2 mm. The sheet was die-cut to prepare a square specimen having a size of 25 mm×15 mm. The specimen was immersed in a test oil at 40° C. for 240 hours. The test oil was prepared by incorporating 3% of lauroyl peroxide into Fuel C (mixed liquid of isooctane/toluene=1/1 by volume). After immersion, the specimen was vacuum dried at 23° C. for 24 hours. The dried specimen was folded by 180° and occurrence of cracks on the outer surface of folded specimen was observed by the naked eye. When occurrence of cracks is observed, the resistance to rancid gasoline is regarded as poor.

EXAMPLES 1–7, COMPARATIVE EXAMPLES 1–7

100 parts of a nitrile group-containing highly saturated rubber having a monomer composition shown in Table 1 or Table 2 was kneaded together with 30 parts of carbon black N762 ("Asahi #50" available from Asahi Carbon K.K., average particle diameter: about 80 nm, specific surface area: about 23 m²/g), and 1 part of stearic acid in a closed mixer having a jacket temperature of 50° C. Using an open roll having a surface temperature of 50° C., 1.5 parts of tetraethylthiuram disulfide ("Nocceler TET" available from Ouchi Shinko K.K.) and 1.5 parts of N-cyolohexyl-2-benzothiazylsulfenamide ("Nocceler CZ" available from Ouchi Shinko K.K.) were simultaneously added to the kneaded rubber. Then 0.5 part of sulfur (available from Hosoi kagaku Kogyo K.K., 325 mesh) and 5 parts of zinc oxide (available from Seido Kagaku Kogyo K.K., purity: higher than 99.5) were added in this order. The thus-obtained rubber composition was press-molded at 170° C. and 9 MPa for 20 minutes to prepare a specimen. The physical properties of the specimen were evaluated. The results are shown in Table 1 and Table 2.

EXAMPLE 8

100 parts of a nitrile group-containing highly saturated rubber having a monomer composition shown in Table 1 was kneaded together with 50 parts of carbon black N550 ("Asahi #50" available from Asahi Carbon K.K., average particle diameter: about 45 nm, specific surface area: about 40 m²/g), 1 part of substituted diphenylamine ("Naugard 445" available from Uniroyal Chemicals Co., and 1 part of 2-mercaptobenzothiazole zinc sdalt ("Nocrac NBZ" available from Ouchi Shinko K.K.) in a closed mixer having a jacket temperature of 50° C. Using an open roll having a surface temperature of 50° C., 1,3-bis(tert-butyl-peroxyisopropyl)benzene ("Vulcup 40KE" available from Hercules Co.) was added to the kneaded rubber. The thus-obtained rubber composition was press-molded at 170° C. and 9 MPa for 20 minutes to prepare a specimen. The physical properties of the specimen were evaluated. The results are shown in Table 1.

The contents of monomer units in the nitrile group-containing highly saturated copolymer rubber were measured by $^1$H-NMR, iodine value determination and nitrogen content determination by semi-micro Kjeldahl method. It was confirmed that there was no contradiction between the amount of monomers consumed for polymerization and the amount of residual monomers.

TABLE 1

|  | Examples | | | | | | | |
| --- | --- | --- | --- | --- | --- | --- | --- | --- |
|  | 1 | 2 | 3 | 4 | 5 | 6 | 7 | 8 |
| Monomer unit composition of nitrile group-containing highly saturated copolymer rubber | | | | | | | | |
| (a) 1,3-Butadiene units (wt. %) | 7 | 7 | 5 | 5 | 6 | 6 | 6 | 6 |
| (b) Hydrogenated butadiene units (wt. %) | 28 | 19 | 29 | 32 | 38 | 34 | 34 | 34 |
| (c) Acrylonitrile units (wt. %) | 44 | 44 | 45 | 42 | 44 | 42 | 42 | 42 |
| (d) Butyl acrylate units (wt. %) | 21 | 30 | 21 | 21 | — | — | — | — |
| Isoprene units (wt. %) | — | — | — | — | 12 | 18 | — | — |
| Styrene units (wt. %) | — | — | — | — | — | — | 18 | 18 |
| Monomer units (d) (mol %) | 10 | 15 | 10 | 10 | 10 | 15 | 10 | 10 |
| Monomer units (a) + (b) (wt. %) | 35 | 26 | 34 | 37 | 44 | 40 | 40 | 40 |
| Number average molecular weight (×10³) | 90 | 91 | 89 | 91 | 88 | 90 | 90 | 97 |
| Dry physical properties | | | | | | | | |
| Tensile strength (MPa) | 17 | 15 | 18 | 19 | 21 | 20 | 22 | 23 |
| Elongation (%) | 480 | 460 | 480 | 450 | 460 | 480 | 460 | 350 |
| Hardness (IRHD-micro) | 65 | 63 | 63 | 62 | 62 | 63 | 62 | 78 |
| Fuel D immersion test | | | | | | | | |
| Volume change | 32 | 31 | 35 | 38 | 38 | 42 | 42 | 43 |

TABLE 1-continued

|  | Examples | | | | | | | |
| --- | --- | --- | --- | --- | --- | --- | --- | --- |
|  | 1 | 2 | 3 | 4 | 5 | 6 | 7 | 8 |
| Hardening test | | | | | | | | |
| Difference in hardness | 0 | 0 | 2 | 2 | 2 | 0 | 0 | 0 |
| Ranoid gasoline resistance test | | | | | | | | |
| Presence of surface cracks | not | not | not | not | not | not | not | not |

The content of isoprene units includes contents of isoprene units and saturated isoprene units. The content of saturated conjugated diene units, namely, the contents of saturated 1,3-butadiene units and saturated isoprene units were determined by measuring the ratio thereof by $^1$H-NMR and by measuring the amount of unsaturated bonds remaining in the backbone chain.

TABLE 2

|  | Comparative Examples | | | | | |
| --- | --- | --- | --- | --- | --- | --- |
|  | 1 | 2 | 3 | 4 | 5 | 6 |
| Monomer unit composition of nitrile group-containing highly saturated copolymer rubber | | | | | | |
| (a) 1,3-Butadiene units (wt. %) | 6 | 6 | 7 | 5 | 6 | 8 |
| (b) Hydrogenated butadiene units (wt. %) | 50 | 47 | 41 | 50 | 9 | 39 |
| (c) Acrylonitrile units (wt. %) | 44 | 44 | 44 | 25 | 50 | 38 |
| (d) Butyl acrylate units (wt. %) | — | 3 | 8 | 20 | 35 | 15 |
| Monomer units(d) (mol %) | 0 | 1 | 4 | 9 | 18 | 7 |
| Monomer units(a) + (b) (wt. %) | 56 | 53 | 48 | 55 | 15 | 47 |
| Number average molecular weight (×10$^3$) | 87 | 92 | 91 | 89 | 90 | 92 |
| Dry physical properties | | | | | | |
| Tensile strength (MPa) | 27 | 25 | 20 | 17 | 10 | 23 |
| Elongation (%) | 580 | 520 | 510 | 510 | 430 | 560 |
| Hardness (IRHD-micro) | 63 | 62 | 61 | 60 | 68 | 60 |
| Fuel D immersion test | | | | | | |
| Volume change | 35 | 35 | 36 | 70 | 25 | 48 |
| Hardening test | | | | | | |
| Difference in hardness | 20 | 17 | 7 | 0 | 0 | 8 |
| Rancid gasoline resistance test | | | | | | |
| Presence of surface cracks | not | not | not | not | not | not |

A crosslinked product of the nitrile group-containing highly saturated copolymer rubber of the present invention harm appropriate tensile strength, elongation and hardness, exhibits reduced volume change in oil, does not harden in oil, and has excellent resistance to rancid gasoline.

In contrast, a crosslinked product (Comparative Example 1) of nitrile group-containing highly saturated copolymer rubber containing large amounts of monomer units (a) and monomer units (b) but not containing monomer units (d), a crosslinked product (Comparative Example 2, 3) of nitrile group-containing highly saturated copolymer rubber containing large amounts of monomer units (a) and monomer units (b) but containing a reduced amount of monomer units (d), and a crosslinked product (Comparative Example 6) of nitrile group-containing highly saturated copolymer rubber containing monomer units (d) in a sufficient weight % but reduced mol % poor have a large elongation and tends to harden in oil.

A crosslinked product (Comparative Example 4) of a nitrile group-containing copolymer rubber containing a reduced amount of monomer units (c) has a large elongation and exhibits a large volume change in oil. A crosslinked product (Comparative Example 5) of a nitrile group-containing copolymer rubber containing too large amounts of monomer units (c) and monomer units (d) has poor tensile strength.

A crosslinked product of the nitrile group-containing highly saturated copolymer rubber of the present invention exhibits good resistance to rancid gasoline, a reduced volume change in oil and does not harden even when it is placed in contact with oil containing condensed aromatics, and good dry physical properties.

INDUSTRIAL APPLICABILITY

A crosslinked rubber product of the present invention is useful an materials for sealing material, cushioning material, protective material, wire coating material, and materials for belts, hoses, diaphragms, boots and rolls, used in automobiles and other transports, general instruments and apparatuses, electrical and electronic instruments and buildings. Especially the crosslinked rubber product is suitable for materials for fuel hoses and sealing materials.

What is claimed is:

1. A nitrile group-containing highly saturated copolymer rubber comprising (a) 0 to 20% by weight of 1,3-butadiene units, (b) 10 to 45% by weight of saturated 1,3-butadiene units, (c) 41 to 46% by weight of α,β-ethylenically unsaturated nitrile monomer units, and (d) 10 to 35% by weight and at least 8% by mol of other monomer units, wherein the sum of 1,3-butadiene units (a) and saturated 1,3-butadiene units (b) is in the range of 20 to 50% by weight.

2. The nitrile group-containing highly saturated copolymer rubber according to claim 1, which comprises (a) 0 to 15% by weight of 1,3-butadiene units, (b) 10 to 45% by weight of saturated 1,3-butadiene units, (c) 41 to 46% by weight of α,β-ethylenically unsaturated nitrile monomer units, and (d) 11 to 33% by weight and 8 to 30% by mol of other monomer units, wherein the sum of 1,3-butadiene units (a) and saturated 1,3-butadiene units (b) is in the range of 23 to 47% by weight.

3. The nitrile group-containing highly saturated copolymer rubber according to claim 2, which comprises (a) 0 to 10% by weight of 1,3-butadiene units, (b) 15 to 40% by weight of saturated 1,3-butadiene units, (c) 41 to 46% by weight of α,β-ethylenically unsaturated nitrile monomer units, and (d) 12 to 30% by weight and 9 to 30% by mol of other monomer units, wherein the sum of 1,3-butadiene units (a) and saturated 1,3-butadiene units (b) is in the range of 25 to 30% by weight.

4. The nitrile group-containing highly saturated copolymer rubber according to claim 1, wherein the sum of monomer units (c) and monomer units (d) is in the range of 50 to 80% by weight.

5. The nitrile group-containing highly saturated copolymer rubber according to claim 1, wherein the sum of monomer units (c) and monomer units (d) is in the range of 55 to 75% by weight.

6. The nitrile group-containing highly saturated copolymer rubber according to claim 1, which is a product prepared by hydrogenating a copolymer of 1,3-butadiene, an α,β-ethylenically unsaturated nitrile monomer, and a monomer copolymerizable with 1,3-butadiene and the α,β-ethylenically unsaturated nitrile monomer.

7. The nitrite group-containing highly saturated copolymer rubber according to claim 1, wherein α,β-ethylenically unsaturated nitrite monomer is selected from acrylonitrile, α-chloroacrylonitrile, α-bromoacrylonitrile, methacrylonitrile and ethacrylonitrile.

8. The nitrile group-containing highly saturated copolymer rubber according to claim 1, which has a number average molecular weight of 10,000 to 2,000,000.

9. A crosslinkable rubber composition comprising 100 parts by weight of the nitrile group-containing highly saturated copolymer rubber as claimed in claim 1, and 0.1 part to 10 parts by weight of a sulfur-containing crosslinking agent or 0.5 part to 8 parts by weight of an organic peroxide crosslinking agent.

10. A crosslinked rubber product made by crosslinking the crosslinkable rubber composition as claimed in claim 9.

11. The nitrile group-containing highly saturated copolymer rubber according to claim 1, wherein said other monomer units are units derived from at least one monomer selected from the group consisting of α-olefins other than 1-butene, conjugated diene monomers other than 1,3-butadiene, non-conjugated diene monomers, unsaturated carboxylic acid esters, aromatic vinyl monomers, fluorine-containing vinyl monomers, unsaturated monocarboxylic acids, and unsaturated polycarboylic acids and anhydrides thereof.

12. The nitrile group-containing highly saturate copolymer rubber according to claim 1, wherein said other monomer units are units derived from at least one monomer selected from the group consisting of butyl acrylate, isoprene and styrene.

13. The nitrile group-containing highly saturated copolymer rubber according to claim 1, wherein said other monomer units are units derived from at least one monomer selected from the group consisting of isoprene and styrene.

* * * * *